United States Patent

Kawachi et al.

[11] Patent Number: 5,591,684
[45] Date of Patent: Jan. 7, 1997

[54] GLASS BUBBLES FOR USE AS FILLERS IN PRINTED CIRCUIT BOARD

[75] Inventors: Shinji Kawachi; Yoshifumi Sato; Yasuhiro Nishimura, all of Shiga-ken, Japan

[73] Assignee: Nippon Electric Glass Co., Ltd., Otsu, Japan

[21] Appl. No.: 316,725

[22] Filed: Oct. 3, 1994

[51] Int. Cl.$^6$ ............................................. C03C 12/00
[52] U.S. Cl. ................... 501/33; 501/66; 501/67; 428/405; 428/406
[58] Field of Search ............................... 501/33, 65, 66, 501/67, 70; 428/405, 406

[56] References Cited

U.S. PATENT DOCUMENTS

| | | | |
|---|---|---|---|
| 4,367,919 | 1/1983 | Tung et al. | 501/65 X |
| 4,391,646 | 7/1983 | Howell | 501/65 X |
| 4,983,550 | 1/1991 | Goetz et al. | 501/65 X |
| 5,100,842 | 3/1992 | Stevenson et al. | 501/77 X |
| 5,217,928 | 6/1993 | Goetz et al. | 501/33 |
| 5,292,690 | 3/1994 | Kawachi et al. | 501/33 |

*Primary Examiner*—Karl Group
*Attorney, Agent, or Firm*—Collard & Roe, P.C.

[57] ABSTRACT

Glass bubbles for use as fillers in a plastic resin substrate of an electrical printed circuit board are light in weight, low in density, and small in alkali amount leached sufficiently to insure electrical insulation resistance of the substrate, and consist essentially of, by weight, $SiO_2$ 40.0–60.0%, $Al_2O_3$ 5.0–22.0%, $B_2O_3$ 1.0–15.0%, CaO 10.0–30.0%, BaO 0–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.54, $V_2O_5$ 0–10.0%, $TiO_2$ 0–10.0%, and $SO_3$ 0.05–1.7%.

11 Claims, 1 Drawing Sheet

GLASS BUBBLES FOR USE AS FILLERS IN PRINTED CIRCUIT BOARD

BACKGROUND OF THE INVENTION

The present invention relates to glass bubbles for use as fillers in a plastic resin and a method for producing the bubbles and, in particular, to such glass bubbles which are adaptable for fillers in a substrate of an electrical printed circuit board.

Glass bubbles or hollow glass spheres have been used as fillers in plastic resin articles so as to reinforce the articles. U.S. Pat. No. 5,292,690 discloses glass bubbles which have an improved compressive strength. The glass bubbles also have the reduced alkali amount leached from the glass so as to improve the adhesive strength. In order to reduce the alkali amount leached from the glass, contents of alkali elements in the composition of the glass bubbles are reduced. Thus, U.S. Pat. No. 5,292,690 discloses a composition for the glass bubbles which consists essentially of, by weight, $SiO_2$ 40–59%, $R_2O$ 2–17%, $R_2O$ being at least one selected from $Na_2O$, $K_2O$, and $Li_2O$, $B_2O_3$ 1–25%, RO 5–25%, RO being at least One selected from CaO, MgO, BaO, ZnO and SrO, $RO_2$ 6–40%, $RO_2$ being at least one selected from $TiO_2$ and $ZrO_2$, $Al_2O_3$ 0–13%, $P_2O5$ 0–3%, and $SO_3$ 0.1–1.0%. Bubble-forming powders of the composition are reheated to form glass bubbles. The glass bubbles have diameters of 1–130 μm and wall thickness of 0.5–10 μm and consist essentially of, by weight, $SiO_2$ 42–58%, $R_2O$ 3–16%, $R_2O$ being at least one selected from $Na_2O$, $K_2O$, and $Li_2O$, $B_2O_3$ 3.5–23%, RO 6–22%, RO being at least one selected from CaO, MgO, BaO, ZnO and SrO, $RO_2$ 7–26%, $RO_2$ being at least one selected from $TiO_2$ and $ZrO_2$, $Al_2O_3$ 0–13%, $P_2O5$ 0–2%, and $SO_3$ 0.2–0.8%.

Since glass bubbles are hollow members, they are light in weight and low in dielectric constant in comparison with own dielectric constant of the glass forming the bubbles. Accordingly, it has recently been proposed to use glass bubbles for fillers in plastic substrates of electrical printed circuit boards.

However, glass bubbles known in the art are not suitable for fillers in the printed circuit boards because alkali amount leached therefrom is not sufficiently suppressed but badly effects the electrical insulation resistance of plastic substrates of the electrical printed circuit boards. Although the glass bubbles disclosed in U.S. Pat. No. 5,292,690 are reduced in alkali contents and therefore in the alkali amount leached, the alkali amount leached is required to be further reduced for use in the electrical printed circuit boards.

Reduction of alkali contents in the glass for forming the bubbles results in reduction of $SO_3$ contents in the glass and therefore reduces $SO_2$ gas generated from the $SO_3$ contents so that production of bubbles is made difficult.

SUMMARY OF THE INVENTION

Therefore, it is an object of the present invention to provide glass bubbles for use as fillers in plastic resin articles which are light in weight, low in density, and small in alkali amount leached sufficiently to insure electrical insulation resistance of the plastic articles.

It is another object of the present invention to provide a composition for forming the glass bubbles.

It is another object of the present invention to provide a method for producing the glass bubbles.

According to the present invention, there is provided glass bubbles having diameters of 1–130 μm for use in fillers for plastic resin articles. The glass bubbles consist essentially of, by weight, $SiO_2$ 40.0–60.0%, $Al_2O_3$ 5.0–22.0%, $B_2O_3$ 1.0–15.0%, CaO 10.0–30.0%, BaO 0–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.5%, $V_2O_5$ 0–10.0%, $TiO_2$ 0–10.0%, and $SO_3$ 0.05–1.7%.

Preferably, the glass bubbles may consist essentially, by weight, $SiO_2$ 42.0–58.0%, $Al_2O_3$ 5.0–20.0%, $B_2O_3$ 2.0–12.0%, CaO 18.0–27.0%, BaO 0.1–13.0%, MgO 0–6.0%, ZnO 0–6.0%, SrO 0–6 0% $Na_2O+K_2O+Li_2O$ 0–1.9%, $As_2O_3+Sb_2O_3$ 0–1.2% $V_2O_5$ 0–7.0%, $TiO_2$ 0–7.0%, and $SO_3$ 0.05–1.5%.

The glass bubbles are adaptable for use fillers in a substrate of an electrical printed circuit board.

In order to provide those glass bubbles, the present invention further provides a composition which consists essentially of, by weight, $SiO_2$ 40.0–60.0%, $Al_2O_3$ 5.0–20.0%, $B_2O_3$ 3.0–20.0%, CaO 10.0–30.0%, BaO 0–15.0%, MgO 0–10.0%, ZnO 0–10.0% SrO 0–10.0% $Na_2O+K_2O+Li_2O$ 0–1.9%, $As_2O_3+Sb_2O_3$ 0–1.5%, $V_2O_5$ 0–10.0%, $TiO_2$ 0–10.0%, $SO_3$ 0.05–3.2%.

According to the present invention, a method for producing the glass bubbles is obtained which comprises steps of: preparing bubble-forming powders of the composition having a diameter of 38 μm or less and consisting essentially of, by weight, $SiO_2$ 40.0–60.0%, $Al_2O_3$ 5.0–20.0%, $B_2O_3$ 3.0–20.0%, CaO 10.0–30.0%, BaO 0–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.5%, $V_2O_5$ 0–10.0%, $TiO_2$ 0–10.0%, $SO_3$ 0.05–3.2%, by melting raw materials for the composition, followed by cooling, grinding add classifying; and passing the bubble-forming powders through flame of 1500°–1700° C. to remelt the bubble-forming powders to thereby generate SO2 gas from the composition so that particles of the bubble-forming powders expand to form the bubbles.

The method may further comprise a step of coating surfaces of the bubble-forming powders with a thin film having a high viscosity, before the step of passing the bubble-forming powders.

The present invention further provides another method for producing the glass bubbles which comprises steps of: preparing glass powders of a glass composition consisting essentially of, by weight, $SiO_2$ 40.0–60.0%, $Al_2O_3$ 5.0–20.0%, $B_2O_3$ 3.0–20.0%, CaO 10.0–30.0%, BaO 0–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.5%, $V_2O_5$ 0–10.0%, and $TiO_2$ 0–10.0%, by melting raw materials for the glass composition, followed by cooling, grinding and classifying; mixing and baking the glass powders with $SO_3$ raw powder of 0.05–3.2% at 1,100°–1,250° C. so as to diffuse the $SO_3$ element into glass of the glass powders, followed by cooling, grinding and classifying to form bubble-forming powders having diameters of 38 μm or less; and passing the bubble-forming powders through flame of 1500°–1700° C. to remelt the bubble-forming powders to thereby generate $SO_2$ gas from the composition so that particles of the bubble-forming powders expand to form the bubbles.

DESCRIPTION OF THE INVENTION

Figure 1:
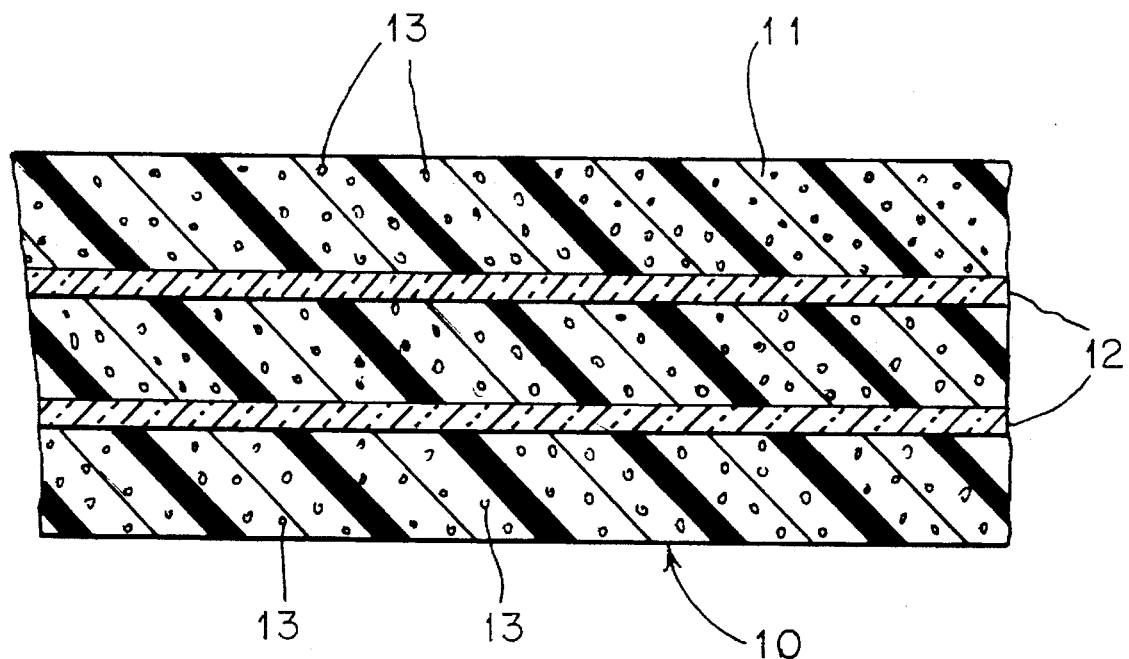
FIG. 1 is a sectional view of a printed circuit board using the glass bubbles as reinforcing fillers therein according to one embodiment of the the present invention.

In order to reduce the alkali amount leached from the glass bubbles and also to insure $SO_3$ contents in the bubble-forming composition sufficiently to form glass bubbles by heating, this invention attempts to restrict the alkali contents in the bubble-forming composition up to 1.9 wt % and to restrict CaO content to 10.0–30.0%.

Accordingly, the bubble-forming composition of the present invention consists essentially of, by weight, $SiO_2$ 40.0–60.0%, $Al_2O_3$ 5.0–20.0%, $B_2O_3$ 3.0–20.0%, CaO 10.0–30.0%, BaO 0–15.0%, MgO 0–10.0%, ZnO 0–10.0%, SrO 0–10.0%, $Na_2O+K_2O+Li_2O$ 0–1.9% $As_2O_3+Sb_2O_3$ 0–1.5%, $V_2O_5$ 0–10.0% $TiO_2$ 0–10.0%, and $SO_3$ 0.05–3.2%.

Now, description will be made as to reasons why amounts of ingredients are restricted as described above.

$SiO_2$ content is 40.0–60.0 wt %, preferably 41–58 wt %. Use of $SiO_2$ less than 40.0 wt % degrades the durability of the resultant glass. $SiO_2$ content more than 60.0 wt % disadvantageously reduces the $SO_3$ content dissolved in the resultant glass, so that generation of $SO_2$ gas by heat treatment is not sufficient to form bubbles.

$Al_2O_3$ content is 5.0–20.0 wt %, preferably 5.0–18.0 wt %. When it is less than 5.0 wt %, the resultant glass has a degraded durability. When it is more than 20.0 wt %, the meltability of the glass is lowered.

$B_2O_3$ content is 3.0–20.0 wt %, preferably, 5.0–15.0 wt %. $B_2O_3$ content less than 3.0 wt % lowers the meltability of the glass. Use of $B_2O_3$ content more than 20.0 wt % considerably reduces the $SO_3$ content in the glass composition and lowers the compressive strength of the glass bubbles.

CaO is an element for improving meltability of the glass and for promoting $SO_3$ to dissolve into the glass, and its content is 10.0–30.0 wt %, preferably, 18.0–25.0 wt %. CaO less than 10.0 wt % considerably reduces $SO_3$ content in the glass, so that generation of $SO_2$ gas by heat treatment is reduced, which makes it difficult to form glass bubbles. On the other hand, CaO more than 30.0 wt % causes devitrification of the glass.

Raw material for CaO is usually sulfate of Ca. During melting a glass batch including the sulfates, the sulfate is decomposed to supply CaO and further provide $SO_3$. The decomposition of sulfate of Ca is made at a high temperature so that $SO_3$ is provided when the molten glass is brought into a sufficiently low viscosity condition. Accordingly, SO3 can readily be diffused in the glass, so that the glass can have sufficient S03 content. Accordingly, CaO content described above are necessary for the bubble-forming glass composition containing the sufficient amount of $SO_3$.

BaO can be used for improving meltability of the glass and for promoting $SO_3$ to dissolve into the glass, and its content is 0–5.0%, preferably, 0.1–13.0 wt %. BaO more than 15 Wt % causes devitrification of the glass.

MgO, ZnO, or SrO can optionally be used up to 10.0 wt %, preferably up to 6 wt %, in order to improve the meltability of the glass and to promote $SO_3$ to dissolve into the glass in addition to CaO and BaO and elements. However, sulfates of Mg, Zn and Sr which are raw materials of MgO, ZnO and SrO decomposes at comparatively low temperature and generate $SO_3$ before the molten glass is brought into the sufficient low viscosity. Therefore, MgO, ZnO, or SrO are different from CaO and BaO and cannot be increased in amount containing in the glass. When MgO, ZnO, or SrO content are more than 10 wt %, the glass is devitrified.

Total amount of alkali elements $Na_2O+K_2O+Li_2O$, is 0–19 wt %. If the bubble-forming glass contains $Na_2O+K_2O+Li_2O$ more than 1.9 wt % add if the glass bubbles formed from the bubble forming glass are used as fillers in a substrate for electrical printed circuit boards, undesired amount of the alkali element leaches from the glass bubbles into the substrate and badly affect the insulation resistance of the substrate.

$As_2O_3$ and $Sb_2O_3$ can optionally be used as blowing agents for generating $O_2$ gas upon heat treating the bubble-forming glass and serve for promoting $SO_3$ to dissolve into the bubble-forming glass. The total amount of $As_2O_3$ and $Sb_2O_3$ is 0–1.5 wt %,, preferably, 0–1.2 wt %.

$V_2O_5$ can optionally be contained in the glass by 0–10.0 wt %, preferably 0–7 wt %. When the bubble-forming glass is heat treated to form the bubbles, this element serves to lower the surface tension of the glass to make it ready to form bubbles. When $V_2O_5$ more than 10.0 wt % is used, the resultant glass is disadvantageously colored.

$TiO_2$ can also be used in the bubble-forming glass 0–10.0 wt %, preferably 0–7.0 wt %, in order to improve the chemical durability of the glass. Use of $TiO_2$ more than 10.0 wt % make it difficult to form bubbles.

$SO_3$ is a blowing agent for generating $SO_2$ gas to form bubbles and is contained by 0.05–3.2%, preferably 0.05–2.6 wt % in the glass. When the amount of $SO_3$ is less than 0.05 wt %, the bubbles cannot be formed from the glass because $SO_2$ gas is insufficiently generated during the heat treatment. When $SO_3$ content is more than 3.2 wt %, $SO_3$ cannot be dissolved in the glass.

Next, description will be made as to methods for producing glass bubbles according to the present invention, below.

At first, a glass batch is prepared which includes glass materials and blowing agents such as silica, alumina, calcium sulfate, barium sulfate and other materials. That is, the glass batch is prepared to form the above-described bubble-forming glass which consists essentially of, by weight, $SiO_2$ 40.0–60.0%, $Al_2O_3$ 5.0–20.0%, $B_2O_3$ 3.0–20.0%, CaO 10.0–30.0%, BaO 0.1–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.5%, $V_2O_5$ 0–10.0%, $TiO_2$ 0–10.0%, $SO_3$ 0.05–3.2%. The glass batch is then melted at 1,250°–1,400° C. for 1–4 hours to obtain a glass plate. The glass plate contains $SO_3$ provided from decomposition of salt cake such as calcium sulfate and barium sulfate. The glass plate is ground into glass particles, which are classified to obtain the bubble-forming glass powders having a diameter of, preferably, 38 μm or less. Then, the bubble-forming powders are passed through flame of 1,500°–1,700° C. to heat treatment or remelt the bubble-forming powders to thereby generate $SO_2$ gas from decomposition of $SO_3$. Thus, particles of the bubble-forming powders expand to form the bubbles.

In case where the $SO_2$ gas generated readily diffuse though the glass walls of bubbles as formed to spread outside during the reheating or heat treatment of bubble-forming glass powders, surfaces of the bubble-forming powders should be previously coated with a thin film (for example, $SiO_2$—$Al_2O_3$—CaO—$B_2O_3$ film) having a high viscosity, before passing the bubble-forming powders through the flame.

The thin film can be coated onto the surfaces of the powders by mixing the powders with a solution comprising B and/or Si alkoxide, soluble inorganic salt, water, and isopropyl alcohol, followed by heating.

The soluble inorganic salt is $Al(NO_3)_3$ $9H_2O$ and $Ca(NO_3)_2 4H_2O$.

In another method for producing glass bubbles according to the present invention, at first, glass, powders are prepared which has a glass composition consisting essentially of, by weight, $SiO_2$ 40.0–60.0%, $Al_2O_3$ 5.0–20.0%, $B_2O_3$ 3.0–20.0%, CaO 10.0–30.0%, BaO 0–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.5%, $V_2O_5$ 0–10.0%, and $TiO_2$ 0–10.0%, by melting raw materials for the glass composition, followed by cooling, grinding and classifying, in the similar manner.

Those glass bubbles have diameters of, preferably, 45 μm or less and relative density of, preferably, 0.4–1.4 g/cm³, for use as fillers in a substrate of an electrical printed circuit board.

Glass bubbles having various diameters and relative density can be produced according to various uses.

EXAMPLES

Thirteen (13) samples Nos. 1–13 of bubble-forming

TABLE 1

| Sample No. | (wt %) | | | | | | | | | | | | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 |
| $SiO_2$ | 45.0 | 44.3 | 53.2 | 53.8 | 42.7 | 50.8 | 44.3 | 46.5 | 52.8 | 52.2 | 54.2 | 59.0 | 51.3 |
| $Al_2O_3$ | 12.0 | 11.0 | 12.3 | 13.4 | 10.4 | 8.0 | 10.6 | 16.0 | 12.8 | 13.3 | 4.9 | 6.0 | 10.0 |
| $B_2O_3$ | 15.0 | 9.0 | 9.0 | 9.4 | 8.5 | 6.0 | 8.7 | 14.0 | 7.3 | 7.1 | 11.8 | 8.5 | 12.5 |
| CaO | 21.0 | 23.0 | 18.6 | 20.7 | 22.0 | 18.2 | 22.3 | 20.0 | 20.8 | 21.9 | 15.6 | 15.0 | 7.0 |
| BaO | 4.0 | 10.0 | 4.1 | 0.1 | 9.5 | 5.0 | 9.7 | 0.2 | 0.4 | 0.4 | — | — | 5.0 |
| MgO | 0.2 | — | 0.2 | 0.3 | 0.1 | 0.2 | 0.1 | 0.2 | 0.8 | 0.8 | — | 0.4 | 2.0 |
| ZnO | — | — | — | — | — | 5.0 | — | — | — | — | 2.0 | — | — |
| SrO | — | — | — | 0.5 | — | 0.2 | — | 0.2 | 0.2 | 0.2 | — | 2.0 | 1.0 |
| $Na_2O$ | 0.3 | 1.0 | 0.9 | 0.1 | — | 0.3 | 1.0 | 1.5 | 0.2 | 1.5 | 2.7 | 4.0 | 6.0 |
| $K_2O$ | 0.1 | — | 0.1 | 1.3 | — | 0.1 | — | 0.1 | 0.2 | 0.1 | 3.9 | 2.5 | 3.0 |
| $Li_2O$ | 0.6 | — | — | — | — | 0.1 | — | — | — | — | 1.3 | 1.2 | 1.0 |
| $As_2O_3$ | — | — | 0.5 | — | 0.1 | 0.5 | — | — | — | — | — | — | — |
| $Sb_2O_3$ | 1.3 | 1.0 | 0.5 | — | 1.0 | 0.5 | 1.0 | — | — | — | — | — | 0.5 |
| $V_2O_5$ | — | — | — | — | 5.0 | 4.6 | 1.9 | — | — | — | — | — | — |
| $TiO_2$ | — | — | — | — | — | — | — | — | 3.0 | — | — | 0.7 | — |
| $SO_3$ | 0.5 | 0.7 | 0.6 | 0.4 | 0.7 | 0.5 | 0.4 | 1.3 | 1.5 | 2.5 | 0.7 | 0.4 | 0.7 |
| others | | | | | | | | | | | $P_2O_5$ 1.0 $F_2$ 1.9 | $ZrO_2$ 0.3 | — |

Then, the glass powders are mixed with $SO_3$ raw powder such as sulfate like $CaSO_3$ $2H_2O$ of 0.05–3.2%. The mixture is baked at 1,100°–1,250° C. so as to diffuse or dissolve $SO_3$ element into glass of the glass powders. The resultant baked ones are cooled, ground and classified to form bubble-forming powders having diameters of 38 μm or less. The bubble-forming powders are then passed through the flame to form the bubbles, in the similar manner as the above-described method.

In the glass bubbles obtained from the any one of the producing method as described above, volatile or volatilizable elements such as $B_2O_3$, $SO_3$ and the like are volatilized by the reheating, so that those volatile elements are reduced while $SiO_2$, $Al_2O_3$ and the like are increased in the content ratio, in comparison with content ratio in the bubble-forming powder.

Accordingly, the glass bubbles obtained consist essentially of, by weight, $SiO_2$ 40.0–60.0%, $Al_2O_3$ 5.0–22.0%, $B_2O_3$ 1.0–15.0%, CaO 10.0–30.0%, BaO 0.1–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.5%, $V_2O_5$ 0–10.0%, $TiO_2$ 0–10.0%, and $SO_3$ 0.05–1.7%.

In the glass bubbles, preferably, $SiO_2$ is 42.0–58.0%, $Al_2O_3$ is 5.0–20.0%, $B_2O_3$ is 2.0–12.0%, CaO is 18.0–27.0%, BaO is 0.1–13.0%, MgO is 0–6.0%, ZnO is 0–6.0%, SrO is 0–6.0%, $Na_2O+K_2O+Li_2O$ is 0–1.9%, $As_2O_3+Sb_2O_3$ is 0–1.2%, $V_2O_5$ is 0–7.0%, $TiO_2$ is 0–7.0%, and $SO_3$ is 0.05–1.5%, by weight.

powders were prepared which had compositions as shown in Table 1. Samples Nos. 1–10 are according to the present invention and samples Nos. 11–13 are comparative samples.

At first, a batch according to each of samples Nos. 1–13 in Table 1 was prepared and was melted at 1,350° C. for two hours, and then cooled to form a plate. The plate was ground and classified to obtain the sample powder having diameters of 38 μm or less.

The bubble-forming powders were mixed with metal alkoxide (B, Si as metal), soluble inorganic salt ($Al(NO_3)_3$ $9H_2O$ and $Ca(NO_3)_2$ $4H_2O$), water, and isopropyl alcohol to form a slurry. Then, the slurry was heated to obtain powders each surface being coated with a thin $SiO_2$—$Al_2O_3$—CaO—$B_2O_3$ film.

Thereafter, the bubble-forming powders coated with the $SiO_2$—$Al_2O_3$—CaO—$B_2O_3$ film was passed through flame of maximum temperature of 1,600° C. for 5–100 micro seconds and thereby reheated to generate SO2 gas from the glass. Thereby, the powders were expanded to form glass powders having diameters 45 μm or less.

Thus, 13 samples of glass bubbles Nos. 1–13 were obtained from 13 samples of bubble-forming powders Nos. 1–13, respectively. Each of the bubble samples Nos. 1–13 was subjected to analysis of components and measurement of relative density and leached alkali amount. The analyzed components, measured relative density, and measured leached alkali amount are shown in Table 2 for all bubble samples Nos. 1–13.

TABLE 2

| Sample No. | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 50.1 | 47.4 | 56.9 | 57.4 | 45.3 | 53.2 | 47.2 | 50.6 | 57.5 | 56.9 | 60.8 | 63.8 | 57.7 |
| $Al_2O_3$ | 13.3 | 11.7 | 13.1 | 14.3 | 11.0 | 8.4 | 11.3 | 18.3 | 13.0 | 13.7 | 5.5 | 6.5 | 11.5 |
| $B_2O_3$ | 6.7 | 3.8 | 3.8 | 4.0 | 3.6 | 2.5 | 3.7 | 5.6 | 2.9 | 2.8 | 5.3 | 3.7 | 5.2 |
| CaO | 23.3 | 24.5 | 19.9 | 22.0 | 23.3 | 19.0 | 23.7 | 22.9 | 21.3 | 22.6 | 17.5 | 16.2 | 8.3 |
| BaO | 4.4 | 10.7 | 4.4 | 0.1 | 10.1 | 5.2 | 10.3 | 0.2 | 0.4 | 0.4 | — | — | 5.8 |
| MgO | 0.2 | — | 0.2 | 0.3 | 0.1 | 0.2 | 0.1 | 0.2 | 0.8 | 0.8 | — | 0.4 | 2.3 |
| ZnO | — | — | — | — | — | 5.2 | — | — | — | — | 2.2 | — | — |
| SrO | — | — | — | 0.5 | — | 0.2 | — | 0.2 | 0.2 | 0.2 | — | 2.2 | 1.1 |
| $Na_2O$ | 0.2 | 0.7 | 0.6 | 0.1 | — | 0.2 | 0.7 | 1.1 | 0.1 | 1.1 | 2.1 | 3.1 | 4.5 |
| $K_2O$ | 0.1 | — | 0.1 | 1.0 | — | 0.1 | — | 0.1 | 0.1 | 0.1 | 2.9 | 1.8 | 2.1 |
| $Li_2O$ | 0.4 | — | — | — | — | 0.1 | — | — | — | — | 1.0 | 0.9 | 0.7 |
| $As_2O_3$ | — | — | 0.3 | — | 0.1 | 0.3 | — | — | — | — | — | — | — |
| $Sb_2O_3$ | 1.0 | 0.7 | 0.3 | — | 0.7 | 0.3 | 0.7 | — | — | — | — | — | 0.3 |
| $V_2O_5$ | — | — | — | — | 5.3 | 4.8 | 2.0 | — | — | — | — | — | — |
| $TiO_2$ | — | — | — | — | — | — | — | — | 2.8 | — | — | 0.8 | — |
| $SO_3$ | 0.3 | 0.5 | 0.4 | 0.3 | 0.5 | 0.3 | 0.3 | 0.8 | 0.9 | 1.4 | 0.6 | 0.3 | 0.5 |
| others | — | — | — | — | — | — | — | — | — | — | $P_2O_5$ 0.8; $F_2$ 1.5 | $ZrO_2$ 0.3 | — |
| RELATIVE DENSITY (g/cm³) | 1.03 | 1.13 | 0.98 | 1.08 | 0.95 | 1.25 | 0.85 | 1.21 | 0.80 | 0.66 | 1.15 | 0.90 | 1.00 |
| LEACHED ALKALI AMOUNT (mg) | 0.5 | 0.5 | 0.5 | 0.8 | 0.0 | 0.4 | 0.5 | 0.8 | 0.1 | 0.8 | 5.3 | 5.3 | 5.0 |

The relative density was measured by use of ultra pycnometer produced and sold by Quantachrome Corporation a Japanese company. The leached alkali amount was measured according to an alkali leach test prescribed in JIS (Japanese Industrial Standard) R 3502.

It is seen from Table 2 that bubble samples Nos. 1–10 according to the present invention have relative densities of 0.66–1.25 g/cm³ and the leached alkali amount of 0–0.8 mg. In comparison with this, comparative samples Nos. 11–13 have relative densities of 0.90–1.15 mg/cm³ which are balanced with samples Nos. 1–10 according to the present invention, but have the leached alkali amount of 5 mg or more which are considerably higher than samples Nos. 1–10 according to the present invention.

Referring to FIG. 1, a substrate 10 shown therein is for electrical printed circuit boards and according to one embodiment of the present invention. The substrate comprises a plate of plastic resin 11 and two sheets of glass cloth 12 embedded in the plastic resin 11, and the glass bubbles 13 dispersed through the plastic resin 11 to thereby reinforce the plate. Since the alkali amount leached from the glass bubbles is very small, the substrate can maintain its insulation resistance without bad affect from the bubbles.

What is claimed is:

1. Glass bubbles for use in fillers for plastic resin articles and made by heating bubble-forming powders of a composition containing $SO_3$, said glass bubbles consisting essentially of, by weight, $SiO_2$ 40.0–60.0%, $Al_2O_3$ 5.0–22.0%, $B_2O_3$ 1.0–15.0%, CaO 10.0–30.0%, BaO 0–15.0%, MgO 0–10.0%, ZnO 0–10.0%, SrO 0–10.0%, $Na_2O+K_2O+Li_2O$ 0–1.9%, $As_2O_3+Sb_2O_3$ 0–1.5%, $V_2O_5$ 0–10.0%, $TiO_2$ 0–10.0%, and $SO_3$ 0.05–1.7%.

2. Glass bubbles as claimed in claim 1, which have diameters of 45 μm or less and relative density of 0.4–1.4 g/cm³.

3. Glass bubbles as claimed in claim 1, wherein $SiO_2$ is 42.0–58.0%, $Al_2O_3$ is 5.0–20.0%, $B_2O_3$ is 2.0–12.0%, CaO is 18.0–27.0%, BaO is 0.1–13.0%, MgO is 0–6.0%, ZnO is 0–6.0%, SrO is 0–6.0%, $Na_2O+K_2O+Li_2O$ is 0–1.9%, $As_2O_3+Sb_2O_3$ is 0–1.2%, $V_2O_5$ is 0–7.0%, $TiO_2$ is 0–7.0%, and $SO_3$ is 0.05–1.5%, by weight.

4. Glass bubbles as claimed in claim 1, for use in fillers in a substrate of an electrical printed circuit board.

5. Glass bubbles as claimed in claim 1, wherein said composition of the bubble-forming powders consists essentially of, by weight, $SiO_2$ 40.0–60.0%, $Al_2O_3$ 5.0–20.0%, $B_2O_3$ 3.0–20.0%, CaO 10.0–30.0%, BaO 0–15.0%, MgO 0–10.0%, ZnO 0–10.0%, SrO 0–10.0%, $Na_2O+K_2O+Li_2O$ 0–19%, $As_2O_3+Sb_2O_3$ 0–15%, $V_2O_5$ 0–10.0%, $TiO_2$ 0–10.0%, and $SO_3$ 0.05–3.2%.

6. Glass bubbles as claimed in claim 5, wherein said powders have a diameter of 38 μm or less.

7. Glass bubbles as claimed in claim 5, wherein said heating is carried out by passing said powders through fire flame of 1,500°–1,700° C. to melt said powders to thereby generate $SO_2$ gas from the composition so that particles of said powders expand to form the bubbles.

8. Glass bubbles as claimed in claim 7, wherein, prior to the step of passing through fire flame, surfaces of said powders are coated with a thin film having a high viscosity sufficiently to prevent the $SO_2$ gas from diffusing and spreading outside of the glass bubbles formed by said heating.

9. Glass bubbles as claimed in claim 8, wherein said thin film is coated onto the surface of said powders by mixing said powders with a solution comprising B and/or Si alkoxide, soluble inorganic salt, water, and isopropyl alcohol, followed by heating.

10. Glass bubbles as claimed in claim 9, wherein said soluble inorganic salt is Al(NO$_3$)$_3$ ·9H$_2$O and Ca(NO$_3$)$_2$ ·4H$_2$O.

11. Glass bubbles as claimed in claim 5, wherein said bubble-forming powders of the composition are produced by the steps of:

preparing glass powders of a glass composition consisting essentially of, by weight, SiO$_2$ 40.0–60.0%, Al$_2$O$_3$ 5.0–20.0%, B$_2$O$_3$ 3.0–20.0%, CaO 10.0–30.0%, BaO 0–15.0%, MgO 0–10.0%, ZnO 0–10.0%, SrO 0–10.0%, Na$_2$O+K$_2$O+Li$_2$O 0–1.9%, As$_2$O$_3$+Sb$_2$O$_3$ 0–1.5%, V$_2$O$_5$ 0–10.0% and TiO$_2$ 0–10.0%, by melting raw materials for the glass composition, followed by cooling, grinding and classifying;

mixing and baking said glass powders with SO$_3$ raw powder of 0.05–3.2% at 1,100°–1,250° C. so as to diffuse said SO$_3$ into glass of said glass powders, followed by cooling, grinding and classifying to form bubble-forming powders.

* * * * *